United States Patent [19]
Roberts et al.

[11] Patent Number: 6,084,755
[45] Date of Patent: Jul. 4, 2000

[54] PROTECTIVE RELAY-BASED MONITORING SYSTEM OF DC POWER WITHIN AN ELECTRIC POWER SUBSTATION

[75] Inventors: Jeffrey B. Roberts; Tony J. Lee; David E. Whitehead, all of Pullman, Wash.

[73] Assignee: Schweitzer Engineering Laboratories, Inc., Pullman, Wash.

[21] Appl. No.: 09/169,370

[22] Filed: Oct. 8, 1998

[51] Int. Cl.[7] .................................................... H02H 3/00
[52] U.S. Cl. .............................. 361/42; 361/45; 361/86; 361/115
[58] Field of Search ................................ 361/42, 45, 43, 361/50, 18, 86, 115

[56] References Cited

U.S. PATENT DOCUMENTS 3,801,898   4/1974   Young ......................................... 324/51

OTHER PUBLICATIONS

"DC Distribution System" By F.L. Brennan 1980 vol. 9, Electric Power Research Institute.

*Primary Examiner*—Stephen W. Jackson
*Attorney, Agent, or Firm*—Jensen & Puntigam, P.S.

[57] ABSTRACT

A DC monitoring system is provided in each protective relay in an electric power substation to detect DC grounds on the DC supply system. The DC monitoring system includes a first portion which indicates the presence of a DC ground. In a second portion of the system, the voltages at the contact inputs of the relay are recognized and compared against a standard voltage value range. An indication is provided when the recognized voltage is within said range. The combination of the indications from the first and second portions is useful in determining the location of DC grounds in the substation DC supply system.

12 Claims, 4 Drawing Sheets

| LOCATION | PDCG | NDCG | CONTACT 40 | CONTACT 38 | CONTACT 46 | TRIP COIL 20 | TRIP COIL 22 | CLOSE COIL 32 |
| --- | --- | --- | --- | --- | --- | --- | --- | --- |
| 1. BUS 12a, 12b: ALL RELAY CONTACTS OPEN | Y | N | N | N | N | N | N | N |
| 2. CONDITION #1 WITH SWITCH 42 CLOSED | Y | N | N | N | N | N | N | N |
| 3. CONDITION #1 WITH BREAKER CONTACT 28 AND 30 CLOSED | Y | N | N | N | N | N | N | N |
| 4. CONDITION #1 WITH BREAKER CONTACT 35 CLOSED | Y | N | N | N | N | N | N | N |
| 5. BETWEEN RELAY CONTACT INPUT 42 & SWITCH 40, SWITCH 42 OPEN | N | Y | Y | N | N | N | N | N |
| 6. CONDITION #5 WITH SWITCH 42 CLOSED | Y | N | N | N | N | N | N | N |
| 7. BETWEEN TRIP CONTACT 24 & BREAKER CONTACT 28; CONTACT 28 OPEN | N | Y | N | N | N | Y | N | N |
| 8. CONDITION #7 WITH CONTACT 28 CLOSED | N | Y | N | N | N | N | N | N |
| 9. BETWEEN BREAKER CONTACT 28 & TRIP COIL 20; CONTACT 28 OPEN | N | Y | N | N | N | N | N | N |
| 10. CONDITION #9 WITH CONTACT 28 CLOSED | N | Y | N | N | N | N | N | N |
| 11. BETWEEN TRIP CONTACT 26 & BREAKER CONTACT 30; CONTACT 30 OPEN | Y | N | N | N | N | N | Y | N |
| 12. CONDITION #11 WITH CONTACT 30 CLOSED | N | Y | N | N | N | N | N | N |
| 13. BETWEEN BREAKER CONTACT 30 & TRIP COIL 22; CONTACT 30 OPEN | N | Y | N | N | N | N | N | N |
| 14. CONDITION #13 WITH CONTACT 30 CLOSED | N | Y | N | N | N | N | N | N |
| 15. BETWEEN BREAKER CONTACT 30 & INPUT CONTACT 22; CONTACT 30 OPEN | N | Y | N | Y | N | N | N | N |
| 16. CONDITION #15 WITH CONTACT 30 CLOSED | Y | N | N | N | N | N | N | N |
| 17. BETWEEN CLOSE CONTACT 34 & BREAKER CONTACT 35; CONTACT 35 OPEN | Y | N | N | N | N | N | N | Y |
| 18. CONDITION #17 WITH CONTACT 35 CLOSED | Y | N | N | N | N | N | N | N |
| 19. BETWEEN BEAKER CONTACT 35 & CLOSE COIL 32; CONTACT 35 OPEN | N | Y | N | N | N | N | N | N |
| 20. CONDITION #19 WITH CONTACT 35 CLOSED | N | Y | N | N | N | N | N | N |

PROTECTIVE RELAY-BASED MONITORING SYSTEM OF DC POWER WITHIN AN ELECTRIC POWER SUBSTATION

TECHNICAL FIELD

This invention relates generally to the detection of inadvertent DC (direct current) grounds in the DC supply circuit in an electric power substation, and more particularly concerns a detection system which includes a DC monitoring circuit in protective relays in the substation in combination with voltage information at the contact inputs of the protective relays to determine the location of the DC grounds.

BACKGROUND OF THE INVENTION

Power line protection equipment present in an electric power substation will typically include a plurality of protective relays, instrument transformers for converting the values of voltage and current on the line to levels suitable for use in the protective relays, and circuit breakers responsive to the protective relays, as well as other accompanying elements. The protective relays are used to interrupt AC (alternating current) power distributed from the substation, in response to a protective relay detecting a fault on the power lines. Power for the equipment in the substation, including the protective relays, is provided by a DC supply system, the source of which is a battery. A battery charger is also usually part of the supply system. The DC supply system also typically provides power for communication within the substation.

Most substation battery systems operate on either 24, 48, 125 or 250 volts DC, although it is common to have two different battery systems in a substation, with different voltage levels, e.g. one system may operate at 125 volts while the other operates at 48 volts DC. Typically, DC power systems within a substation are operated ungrounded. Grounding of any part of a DC supply system within such a substation would thus typically be unintentional, i.e. inadvertent. While such inadvertent DC grounds are all of concern, a single inadvertent ground typically will not cause a major DC supply system failure, although it may affect the operation of certain of the equipment within the substation, including possibly the protective relays and the shunt trip coils or close coils which operate the circuit breakers, in particular circumstances. A second DC ground in the DC supply system, on the opposing polarity supply bus, will certainly affect the operation of the equipment or blow the fuses in the system.

A typical DC power system within a substation will include long lengths of wire connections, including wire extending from the battery source in a control house to remote locations in the substation, such as to circuit breakers and system disconnect apparatus. These long wire lengths present significant opportunities for inadvertent DC grounds. Inadvertent grounds can occur for a number of different reasons, but typically are due to a breakdown in the wire insulation. The damage or breakdown can be due to aging, weather, poor connections or other causes. This can occur in any of the wire runs themselves, whether short or long, even within the control house, or at connections to relay coils or switches as well as connections to or within the protective relays.

The DC power system includes plus and minus polarity DC busses, as well as extensive equipment connections. DC grounds on the plus and minus busses can be detected by conventional DC monitoring systems which are typically located in the vicinity of the battery portion of the system. However, DC grounds in the remainder of the DC supply system are usually very difficult and time-consuming to locate. In a substation involving a large plurality of protective relays, transformers, circuit breakers and associated contacts and coils, an indication by the conventional monitoring system of a DC ground will result in an alert to a repair crew, which has the task, upon arrival, if the DC ground is not found to be on the plus or minus bus, of sequentially removing from the substation power circuit each protective relay or other piece of equipment so as to locate the DC ground.

This task is compounded by the fact that specialized personnel must approve the temporary disconnection of circuit breakers in the substation, because removal of the DC power removes the protective relay equipment and the power source required to operate a breaker during a fault. Further, DC ground indications tend to occur more frequently in inclement weather conditions, such as rain storms. The repair of such DC grounds requires the technicians and operators to work within an energized (operating) substation in the rain, which can often be disconcerting to the repair personnel, due to obvious hazards. It is important to locate the DC failure while the power system is wet, because when the system dries out, the DC ground may disappear when the water leaves the break in the wiring insulation (until the next rain storm).

Hence, it is quite desirable to identify the location of inadvertent DC grounds within an electric power substation with greater particularity than is presently possible.

DISCLOSURE OF THE INVENTION

Accordingly, the present invention is a DC monitoring system which is for use in electric power substations having at least one DC supply system which includes positive and negative DC supply busses, the substation including at least one protective relay which is powered by said DC supply, the monitoring system comprising: a first portion which is responsive to voltage between one supply bus and ground and voltage between said two supply busses to determine the presence of a DC ground in the DC supply system and whether the DC ground is closer to one supply bus line than the other and which provides an indication thereof; and a second portion which includes means for measuring voltage at selected contact input connections of the protective relay; means for comparing said contact input voltages against a selected range of standard voltage values; and means providing an indication when the measured voltage is within said range, wherein the combination of the indications from the first portion and the second portion is useful in locating the origin of the DC ground in the DC supply system.

BRIEF DESCRIPTION OF THE DRAWINGS

FIG. 4 is a table showing how the information provided by the system of the present invention can be used to locate an inadvertent DC ground within a power substation.

BEST MODE FOR CARRYING OUT THE INVENTION

Figure 1:
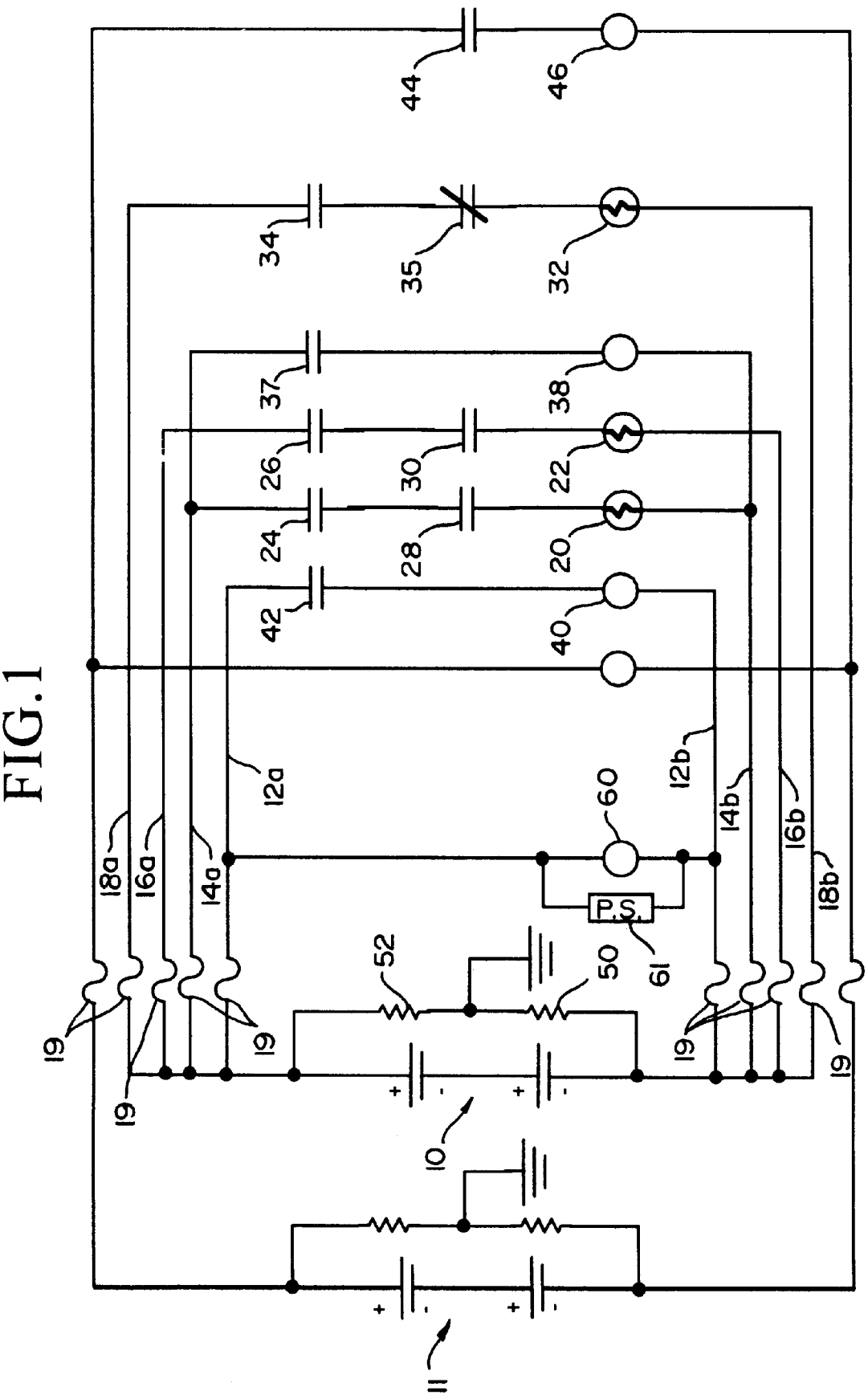
FIG. 1 is a simplified diagram illustrating a portion of a substation protection system, including the DC supply therefor.

As indicated above, an electric power substation, which serves a particular geographical region with electric power will include a protective system involving a variety of equipment, all of which require power for operation and communication. This power is typically provided by a centralized DC station battery system which includes in general a battery charger for maintaining the output of the battery within a specified range. As indicated above, the battery output voltage may differ from installation to installation. DC power could in some cases be provided by a distributed DC system, in which separate batteries are used for each piece of equipment, i.e. the protective relays, or small groups of equipment.

A typical centralized system uses a 125 volt DC battery, and the following description assumes that voltage level. A typical voltage range for a 125 VDC nominal system is from 108 VDC (low voltage) to 150 VDC (maximum voltage). The latter voltage level is often referred to as an equalize voltage and is commonly used with lead-acid batteries. Some systems may have two DC supplies, with different voltage outputs. It should be understood that the present invention is also applicable to substation DC power systems that operate at outputs of other than 125 volts.

Typically, a 125 volt DC system will comprise two groups of series-connected batteries, each group producing 62.5 volts. Each group of batteries includes 25–30 series-connected batteries, typically lead-acid batteries. A single battery charger will charge both groups of batteries simultaneously. Most such DC supply systems include a low voltage warning alarm which generally indicates charger malfunction, as well as a low-low voltage alarm, which indicates that the battery is severely degraded in performance.

The above-described portions of the DC supply system within an electric power substation are quite conventional and many are therefore not discussed in detail hereinafter nor shown specifically in the drawings.

As indicated above, a power line protection system present in a substation will include a large number of protective relays, various instrument transformers and circuit breakers with related trip coils and contacts. For the purposes of explanation of the present invention, a simplified portion of such a substation protective system is shown in FIG. 1. FIG. 1 shows a two-battery set producing 125 VDC and 48 VDC, which would ordinarily include an independent battery charger (not shown) for each battery. The circuit shown in FIG. 1 shows typical DC supply connections for a three-pole trip and reclose breaker application using communication-assisted tripping. In this case, the 125 volt battery 10 is used for breaker tripping, closing and control, while the 48-volt battery 11 is used for the communication equipment, assisted trip and control. The present explanation, however, will focus on the 125-volt system.

The 125 volt battery 10 includes four plus and minus DC bus lines 12a–12b, 14a–14b, 16a–16b and 18a–18b. Fuses 19—19 are provided to protect against shorts between the positive and negative busses. Battery 10 with its associated system wiring and connections is responsible for energizing trip coils 20 and 22 when trip contacts 24 and 26 close in response to a command from the protective relay. Trip coil 22, trip contact 26 and the associated wiring form a redundant trip circuit for increased security. In ordinary operation, the power system circuit breaker controlled by the protective relay is closed and breaker contacts 28 and 30 are closed. Closure of trip contacts 24 and 26 by the protective relay thus results in a current path through the associated trip coils, which in turn results in the circuit breaker associated with the trip coils opening.

Close coil 32 (bus lines 18a–18b) is energized by the DC supply system when the reclosing circuit of the protective relay signals its associated breaker to close by closing breaker contact 34. Closure of the close contacts 34 by the protective relay will result in current flowing through close coil 32, resulting in the closing of the system circuit breaker following operation of the breaker contacts 35.

The DC supply system also provides a communication link between contact 37 and the protective relay contact input 38 as well as communicating the closure of control switch 40 to contact input 42. Control switch 40 is typically an external, manually operated switch, controlled by an operator off of the front panel of the protective relay control terminal.

In addition, the DC supply provides power for the power supply of the protective relay, as well as power to communication equipment if said equipment is external to the protective relay.

As indicated above, the 48-volt battery provides power for communicating a permissive trip signal from a remote line terminal to the protective relay, by virtue of the closure of the control contacts 44, which energizes input contact 46 of the protective relay.

The system of FIG. 1 includes conventional DC monitoring systems for each battery 10 and 11. Referring to battery 10, the monitoring system includes a series connection of resistors 50 and 52, with a center connection to substation ground. Resistors 50 and 52 form a typical DC-ground detector found in most current substations. Typically, each resistor is 10K ohms. In some cases, two small lamps or voltmeters are used in place of the resistors.

The voltage across or the current through each of the resistors 50, 52 is measured to determine the presence of inadvertent DC grounds. When there is no DC ground, the voltage across the resistors will be the same and there will be no current to ground. In the event of an inadvertent ground, voltage across one resistor will be higher than the other (in the case of two lamps, one will be brighter). The resistor having the lowest voltage indicates the particular side of the DC bus (plus or minus) which is associated with the inadvertent ground. As indicated above, however, this system is only able to determine if the DC ground is actually on either bus directly or which bus is closer to the inadvertent ground if the ground is not on a bus. The monitoring system cannot provide any additional information; if the ground is in the equipment, which it most frequently is, the technician/operator must carefully remove each piece of equipment from the system in turn to determine the location of the DC ground, which occurs when the DC ground indicator disappears when the grounded circuit is de-energized.

Figure 2:
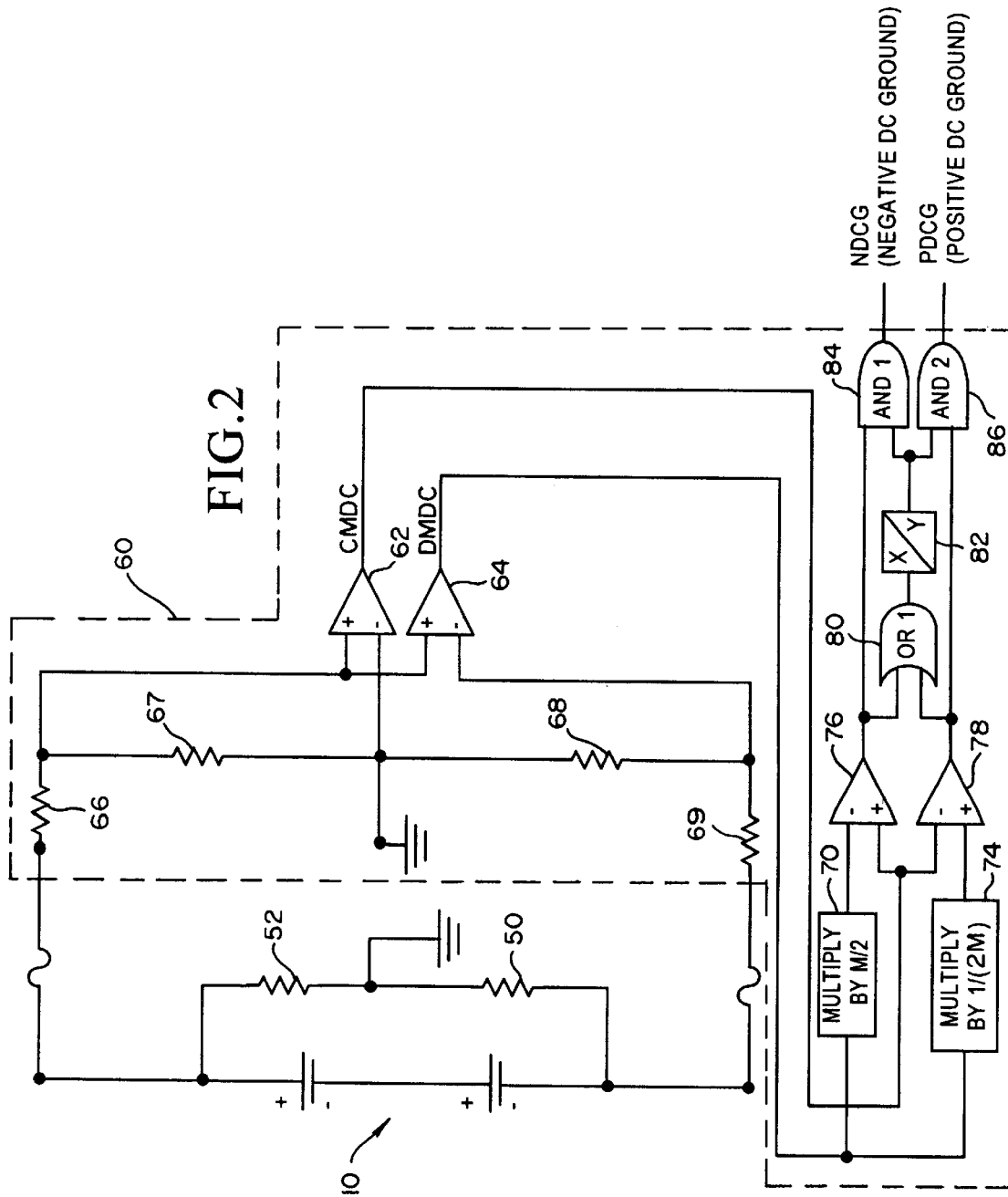
FIG. 2 is a block diagram of one portion of the DC monitoring system of the present invention.

The system of the present invention for providing a more particular determination of DC ground location is located in FIG. 1 at 60 (power supply at 61) and shown in more detail in FIG. 2. It is important to note that the present system requires no additional connections or leads from the DC battery source or the protective relay or other equipment. The connections to the present system are made directly across the DC power lines to the relay (DC plus and minus bus lines). In FIG. 2, the circuit 60 provides two voltage values CMDC and DMDC at the outputs of voltage amplifiers 62 and 64. The input to amplifiers 62 and 64 is through a resistor network comprising resistors 66–69. These resistors, because of their relatively large values (resistors 66 and 69 are 22 MΩ) compared to the values of resistors 50 and 52, draw very little current from the battery (less than 3 microamps).

The DC ground detector of the present invention thus does not adversely affect the operation of conventional DC ground detectors comprising resistors 50 and 52. Amplifier 62 is connected between the positive DC bus 12a and ground of FIG. 1. Hence, it provides what is referred to as a common mode voltage, which is proportional to approximately half of the battery voltage, i.e. 62.5 volts. Amplifier 64, however, is connected between the positive and negative DC busses 12a and 12b and therefore provides what is referred to as a differential mode voltage, which is proportional to the full battery voltage, i.e. 125 volts. The difference between the common mode voltage and the differential mode voltage value is a voltage value which is proportional to the voltage between the negative DC bus 12b and ground.

When an inadvertent DC ground occurs in the DC supply system, the nominal voltage value of amplifier 62 will change significantly. Hence, the voltage values at the output of amplifiers 62 and 64 indicate the presence of inadvertent DC grounds, either on the positive or negative DC busses or in the duration of those busses.

The circuit of FIG. 2 provides protection against "nuisance" alarms which may be caused by transient conditions or other factors. A "dead band" of voltage is created to provide this protection. The output of the differential mode amplifier 64 is applied to multipliers 70 and 74. In multiplier 70, the multiplier value is M/2, while in multiplier 74, the multiplier value is ½M, where M is a selected constant having a range of $1 \leq M2$. The value of M in the present embodiment is 1.03. This value provides a reasonable level of security against false inadvertent DC grounds.

The output of multiplier 70 is then applied to the negative input of a comparator 76, while the output of multiplier 74 is applied to the positive input of a comparator 78. The common mode output of amplifier 62 is applied to the positive input of comparator 76 and the negative input of comparator 78.

Under normal operating conditions, the outputs of both comparators will be low, indicating no DC grounds. If the common mode value (positive bus to ground) is greater than the differential mode value multiplied by M/2, then the output of comparator 76 goes high. Conversely, if the differential mode value multiplied by ½M is greater than the common mode value, then the output of comparator 78 goes high. The outputs of comparators 76 and 78 are applied to an OR gate 80, a high output of which initiates a time-delay pickup and dropout timer 82. Timer 82 is set to prevent erroneous detection of inadvertent DC grounds due to transient conditions and provides time discrimination for inadvertent grounds detected by voltage monitors around open relay contacts.

In the embodiment shown, the time-delayed dropout portion of the timer is set equal to zero so that the output of the timer terminates when the input thereto terminates. The output of timer 82 is applied to AND gates 84 and 86. The other inputs to AND gates 84 and 86 are the outputs of comparators 76 and 78, respectively.

Figure 3:
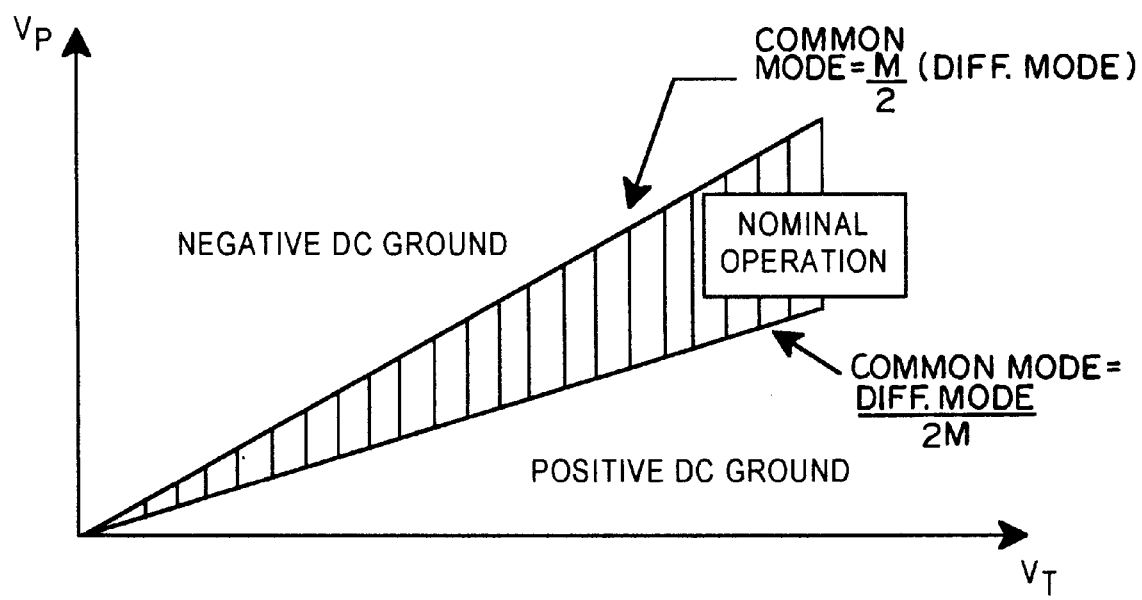
FIG. 3 is a diagram showing another portion of the DC monitoring system of the present invention.

A high output of AND gate 84 is referred to as an NDCG signal, indicative of an inadvertent ground on the negative side (bus) of the supply, while the output of AND gate 86, referred to as a PDCG signal, is indicative of an inadvertent DC ground on the positive side (bus) of the supply. FIG. 3 shows the effect of the circuit of FIG. 2 relative to the declaration of DC grounds.

With a differential mode value of 130 volts, the relay will provide an alarm when the common mode voltage is greater than 63.1 volts or less than 66.95 volts.

The system of FIG. 2, while an improvement over conventional systems by virtue of having a settable range of security to prevent erroneous alarms, still does not have a capability of providing specific information with respect to the location of the DC ground other than being on the positive or negative DC busses or closer to one or the other of those busses. In fact, grounds in certain locations will even present difficulties for the system of FIG. 2 to accurately identify as an inadvertent DC ground.

For instance, referring to FIG. 1, if the inadvertent ground occurs between contact input 40 and control switch 42, with a DC battery voltage of, for example, 140 volts, resistances 50 and 52 both being 10 KΩ, and a contact input resistance of 30 KΩ, the output of the common mode and differential mode voltage amplifiers 62 and 64 will be 80 and 140 volts, respectively. This is a difference of 10 volts for the common mode value from what is measured in normal operation, i.e. without an inadvertent ground.

However, if the battery charger is off line, the low point for the battery which is still within its normal range will be 124.8 volts. In this case, the output of the common mode amplifier will be 71.3 volts, which leaves a small margin of slightly greater than 1 volt between an actual DC ground condition (when the battery is at 140 volts) and a normal condition when the battery is low (but not low enough to produce an alarm). This close margin could easily result in errors in DC ground recognition.

In another example, where the DC ground is located between a trip contact 24 and the trip coil 20, using the previously indicated resistances and a battery voltage of 140 volts, the output of the common mode amplifier 62 will be 139.8 volts DC and the output of the differential mode amplifier 64 will be 140 volts DC. This will result in a DC ground indication, but will also result in a tripping of the breaker if a second inadvertent DC ground appears on the positive DC bus 12a. The known information about such a sequence is simply that the breaker was tripped, without the relay or control switch issuing a trip command. Further, the breaker may or may not reclose. To avoid this possibility, it is particularly important to identify the location of the first inadvertent ground. The present invention makes this identification possible.

In the present invention, in addition to the common mode and differential mode voltage measurements, including the circuit of FIG. 2 which provides a determination of NDCG (negative DC ground) and PDCG (positive DC ground) and the associated alarms, the present invention includes relay contact input voltage measurements which make possible a more accurate and precise determination of the location of inadvertent DC grounds within the substation, including the substation protective equipment. Again, an electric power substation will have a plurality of equipment, including protective relays. If each of the protective relays has a DC monitoring circuit as shown in FIG. 2, an alarm from any of the DC monitors will indicate that there is an inadvertent DC ground in the DC system on the plus or minus DC bus or, if not on the busses, that the DC ground is closer to one bus than the other.

The contact input measurements from each of the relays will provide additional information as to which of the relays has the DC ground and the location of the DC ground associated with that relay. Thus, with the combination of the PDCG and NDCG outputs of FIG. 2 with voltage information at the contact inputs of the relay, location of inadvertent DC grounds becomes more systematic and accurate.

In the simplest embodiment, the voltage at each of the contact inputs of a relay is compared against fixed thresholds. In the embodiment shown, referring to FIG. 1, the contact inputs include contact input 40, among others. The contact input will have a nominal value of voltage for operation. The nominal or normal value is herein defined as the measured differential mode voltage value. When the voltage at each contact input is less than one-quarter of the nominal voltage, no DC alarm is provided and the contact is not energized. If the contact input voltage is between one-quarter and three-quarters of the nominal voltage, an abnormal condition is indicated to exist. Either the contact input is malfunctioning, leakage is occurring around an open contact, a significant resistance exists in a closed contact, or a DC ground exists somewhere between the relay contact itself and the contact input. Within this range, a DC alarm is provided. This indicates that the circuit connected to that input likely has a DC ground.

Normally, a contact input will assert, i.e. close, when the voltage at the contact input is over 50 percent of the nominal voltage. However, between 75 percent and the full nominal value, the contact input will assert and there will in addition be no DC ground alarm. If the applied voltage is greater than 1.3 times the nominal voltage, then the contact input is either defective, incorrectly configured or the battery charger is malfunctioning. An alarm is provided and the contact input is asserted.

Table 4 shows a representative sampling of various possible DC ground locations relative to a protective relay and the resulting PDCG and NDCG outputs and the alarm condition of several relay contact inputs. For instance, location No. 1 is a ground on the VDC1 bus, with all the relay contacts on the relay open. In that case, there is a PDCG alarm, but no alarms from any of the contact inputs. This means that the DC ground is not between any of the open relay contacts and the contact inputs shown. If all of the 125 volt DC contacts are open(which can be readily ascertained), the inadvertent ground must be on one of the DC busses, i.e. busses 12, 14, 16 or 18.

If all of the DC contacts are open and the DC monitor detects an inadvertent DC ground, and one of the contact inputs also indicates a ground, the actual location of the ground can be pinpointed with greater accuracy. For example, where there is a ground between switch contact 42 and contact input 40, PDCG signal will assert with switch contact 42 open, while when the control switch 42 is opened, the relay logic will assert NDCG, as will input contact 40.

While the system of the present invention will not precisely locate every fault, it is substantially better than the existing systems.

The contact input voltage can also be compared against adaptive thresholds as opposed to fixed thresholds. In the adaptive threshold arrangement, the voltage measured at the contact inputs is compared against a preselected fraction of the actual differential mode voltage between the two DC supply busses (positive and negative). For example, it might be considered that the total range of voltages on the contact input might cover 30 to 150 volts for a 125-volt nominal voltage value. A voltage on the contact input of less than 30 volts would be considered as a de-energized input, while a voltage of greater than 30 volts but less than a selected fraction or percentage of the total differential mode voltage (as measured) would result in a DC ground detection alarm.

In the embodiment shown, this selected fraction is $55/100$ or 0.55. A range of values is 0.50–0.75, depending upon the degree of security desired. For the contact input to be energized without a DC ground alarm, the measured voltage at the contact input would be another selected fractional value of the differential mode voltage, but less than the maximum of 150 volts. Above 150 volts would be an indication of charger malfunction. In the present embodiment, the second fraction value is $56/100$ or 0.56. The second fraction will always be slightly greater than the first fraction. For a 140-volt measured differential mode voltage value, the range of voltage which would result in a DC alarm is 30–77 volts. The adaptive threshold provides a more reliable indication of a DC ground, given the relatively wide range of nominal voltages which may be available to the contact input.

Hence, a system for detecting DC grounds in a DC supply system for a power system substation is disclosed which results in an increased ability to readily identify the location of DC grounds within the substation with significantly greater particularity than heretofore possible. Again, while the disclosure above concerns a single or dual battery system for an entire substation, serving a plurality of individual equipment, including numerous protective relays, it should be understood that the present system of DC ground monitoring could work with a "distributed" DC supply arrangement, in which there are a plurality of DC supply systems within a substation, each DC supply serving a few or even one piece of equipment, such as a single protective relay.

Although a preferred embodiment of the invention has been disclosed herein for illustration, it should be understood that various changes, modifications and substitutions may be incorporated in such embodiment without departing from the spirit of the invention, which is defined by the claims as follows.

What is claimed is:

1. A DC monitoring system for use in electric power substations having at least one DC supply system, which includes positive and negative supply busses, the substation including at least one protective relay which is powered by said DC supply, the monitoring system comprising:

a first portion which is responsive to a first voltage between one supply bus and ground and a second voltage between said two supply busses to determine the presence of a DC ground in the DC supply system, and whether the DC ground is closer to one supply bus than the other and provide an indication thereof, wherein in operation of the monitoring system, the first and second voltages are processed to determine the presence and location of a DC ground in the DC supply system.

2. A system of claim 1, wherein the DC supply powers a plurality of protective relays within the substation and wherein said DC monitoring system is included in each of said protective relays.

3. A system of claim 1, wherein the selected range is variable depending upon a measured value of the second voltage between the supply busses.

4. A system of claim 3, wherein the selected range has an upper limit which is a selected portion of said measured voltage value.

5. A system of claim 4, wherein the selected portion is within a range of 50–75%.

6. A system of claim 1, wherein the first portion includes means for determining a common mode voltage value between ground and one of the supply busses and a differential voltage value between the two supply busses, wherein a DC ground is indicated when the common mode voltage is approximately zero and the differential mode voltage is approximately the full DC voltage value.

7. A system of claim 1, wherein the first portion includes means for determining a common mode voltage value between ground and one of the supply busses and a differential voltage value between the two supply busses, wherein a DC ground is indicated when the common mode voltage is approximately equal to the differential mode voltage.

8. A system of claim 1, wherein the first portion includes means for determining a common mode voltage value between ground and one of the supply busses and a differential voltage value between the two supply busses, including means for increasing the sensitivity of the first portion by indicating a DC ground when the common mode voltage is at least equal to the differential mode voltage multiplied by M/2, where M is a selected scalar value and also indicating a DC ground when the common mode voltage is less than the differential mode voltage divided by 2M.

9. A system of claim 8, wherein the selected scalar value has a range of 1–2.

10. A system of claim 1, including a plurality of DC supply systems, each DC supply system including at least one protective relay containing said DC monitoring system.

11. A system of claim 1, including a second portion which includes means for measuring voltage at selected contact input connections of the protective relay; means for comparing said contact input voltages against a selected range of standard voltage values; and means providing an indication when the measured voltage is within said selected range, wherein the combination of the indications from the first portion and the second portion is useful in locating the origin of DC grounds in the DC supply system.

12. A system of claim 11, wherein the selected voltage range is below a nominal value for energizing the contact input.

* * * * *